(12) United States Patent
Ogo et al.

(10) Patent No.: US 9,618,097 B2
(45) Date of Patent: Apr. 11, 2017

(54) TENSIONER

(71) Applicant: TSUBAKIMOTO CHAIN CO., Osaka-shi, Osaka (JP)

(72) Inventors: Toshitaka Ogo, Osaka (JP); Takahiro Shinnoki, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 14/739,085

(22) Filed: Jun. 15, 2015

(65) Prior Publication Data

US 2016/0010729 A1 Jan. 14, 2016

(30) Foreign Application Priority Data

Jul. 9, 2014 (JP) .................................. 2014-141181

(51) Int. Cl.
*F16H 7/22* (2006.01)
*F16H 7/08* (2006.01)

(52) U.S. Cl.
CPC ... *F16H 7/0848* (2013.01); *F16H 2007/0853* (2013.01)

(58) Field of Classification Search
CPC ..... F16H 2007/0806; F16H 2007/0853; F16H 7/0848; F16H 2007/0859; F16H 2007/0812
USPC .......................................................... 474/110
See application file for complete search history.

(56) References Cited

U.S. PATENT DOCUMENTS

| | | | | |
|---|---|---|---|---|
| 4,881,927 A * | 11/1989 | Suzuki | ................. | F16H 7/0848 474/110 |
| 6,447,415 B1 * | 9/2002 | Hashimoto | ............... | F16H 7/08 474/109 |
| 6,612,951 B2 * | 9/2003 | Kurohata | .............. | F16H 7/0848 474/109 |
| 6,811,505 B2 * | 11/2004 | Hashimoto | ........... | F16H 7/0848 474/109 |
| 6,852,049 B2 * | 2/2005 | Markley | ............... | F16H 7/0848 474/109 |
| 6,866,601 B2 * | 3/2005 | Saitoh | ................... | F16H 7/0836 474/109 |
| 6,953,406 B2 * | 10/2005 | Kurokawa | ............ | F16H 7/0848 474/109 |

(Continued)

FOREIGN PATENT DOCUMENTS

| | | |
|---|---|---|
| JP | 11-344036 A | 12/1999 |
| JP | 2004-44749 A | 2/2004 |
| JP | 2006-234088 A | 9/2006 |

*Primary Examiner* — Henry Liu
(74) *Attorney, Agent, or Firm* — Westerman, Hattori, Daniels & Adrian, LLP (57) ABSTRACT

Provided is a tensioner in which the durability of the tensioner body is increased, the tensioner body is reduced in weight, and the arrangement space is reduced. A tensioner 100 includes a tensioner body 110, a plunger 120, and a ratchet 130. The tensioner body 110 has a hole outer circumferential wall 112 and a pair of pin support walls 116, 117. The hole outer circumferential wall 112 has a pair of outer circumferential wall portions 113, 114 crossing a virtual line L extending in the pin longitudinal direction through the center of the plunger housing hole 111. At least one of the outer side surfaces of the pair of pin support walls 116, 117 is formed on the inner side, in the pin longitudinal direction, of the outer side surface of one of the outer circumferential wall portions 113, 114.

2 Claims, 9 Drawing Sheets

(56) References Cited

U.S. PATENT DOCUMENTS

| | | | |
|---|---|---|---|
| 7,458,909 B2* | 12/2008 | Hashimoto | F16H 7/0848 474/110 |
| 7,468,012 B2* | 12/2008 | Hayami | F16H 7/0836 474/110 |
| 8,821,326 B2* | 9/2014 | Yoshida | F16H 7/0848 474/110 |
| 2001/0009876 A1* | 7/2001 | Kurohata | F16H 7/0836 474/110 |
| 2001/0009877 A1* | 7/2001 | Kurohata | F16H 7/0848 474/110 |
| 2002/0006840 A1* | 1/2002 | Kurohata | F16H 7/0836 474/110 |
| 2002/0098931 A1* | 7/2002 | Kurohata | F16H 7/0836 474/109 |
| 2003/0134703 A1* | 7/2003 | Saitoh | F16H 7/0836 474/109 |
| 2003/0186765 A1* | 10/2003 | Konishi | F16H 7/0836 474/109 |
| 2004/0147349 A1* | 7/2004 | Markley | F16H 7/0848 474/109 |
| 2005/0215370 A1* | 9/2005 | Seungpyo | F16H 7/0848 474/110 |
| 2005/0239589 A1* | 10/2005 | Seungpyo | F16H 7/0836 474/110 |
| 2005/0272542 A1* | 12/2005 | Yoshida | F16H 7/0836 474/110 |
| 2006/0160645 A1* | 7/2006 | Markley | F16H 7/0848 474/109 |
| 2006/0194661 A1* | 8/2006 | Hayami | F16H 7/0836 474/110 |
| 2006/0293133 A1* | 12/2006 | Simpson | F16H 7/0848 474/109 |
| 2007/0142144 A1* | 6/2007 | Kurokawa | F16H 7/0848 474/109 |
| 2008/0207366 A1* | 8/2008 | Yoshida | C22C 21/02 474/110 |
| 2008/0261737 A1* | 10/2008 | Yoshida | F16H 7/0836 474/110 |
| 2009/0209376 A1* | 8/2009 | Kurematsu | F16H 7/0836 474/110 |
| 2010/0222167 A1* | 9/2010 | Chekansky | F16H 7/0836 474/110 |
| 2010/0298077 A1* | 11/2010 | Hirayama | F01L 1/02 474/110 |
| 2012/0040790 A1* | 2/2012 | Perissinotto | F16H 7/0836 474/110 |
| 2012/0196709 A1* | 8/2012 | Kurematsu | F16H 7/0848 474/110 |
| 2012/0309570 A1* | 12/2012 | Kurematsu | F16H 7/0848 474/110 |
| 2013/0190116 A1* | 7/2013 | Chekansky | F16H 7/0836 474/110 |
| 2013/0310206 A1* | 11/2013 | Yoshida | F16H 7/0848 474/110 |
| 2013/0324336 A1* | 12/2013 | Chekansky | F16H 7/0836 474/110 |
| 2014/0179471 A1* | 6/2014 | Markley | F16H 7/0836 474/110 |
| 2014/0364257 A1* | 12/2014 | Duffy | F16H 7/0848 474/110 |
| 2015/0354674 A1* | 12/2015 | Markley | F16H 7/08 474/110 |

* cited by examiner

TENSIONER

BACKGROUND OF THE INVENTION

1. Field of the Invention

The present invention relates to a tensioner which is used for imparting an appropriate tension to a transmission belt or transmission chain in a timing system of an engine or the like.

2. Description of the Related Art

Figure 10:
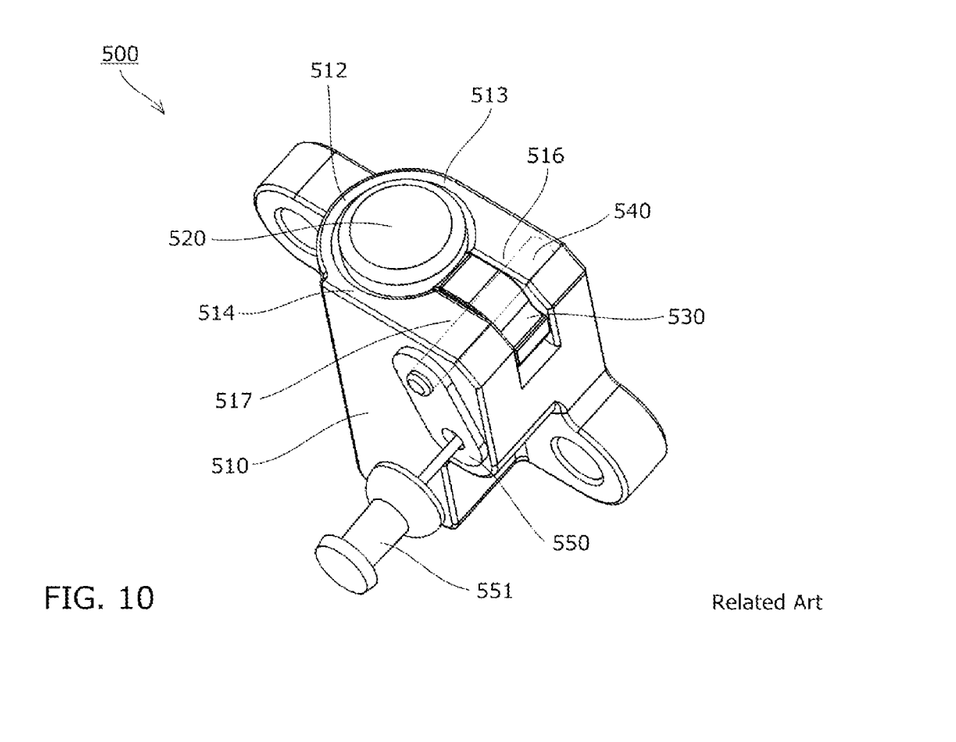
FIG. 10 is a perspective view illustrating the conventional tensioner.
Figure 11:
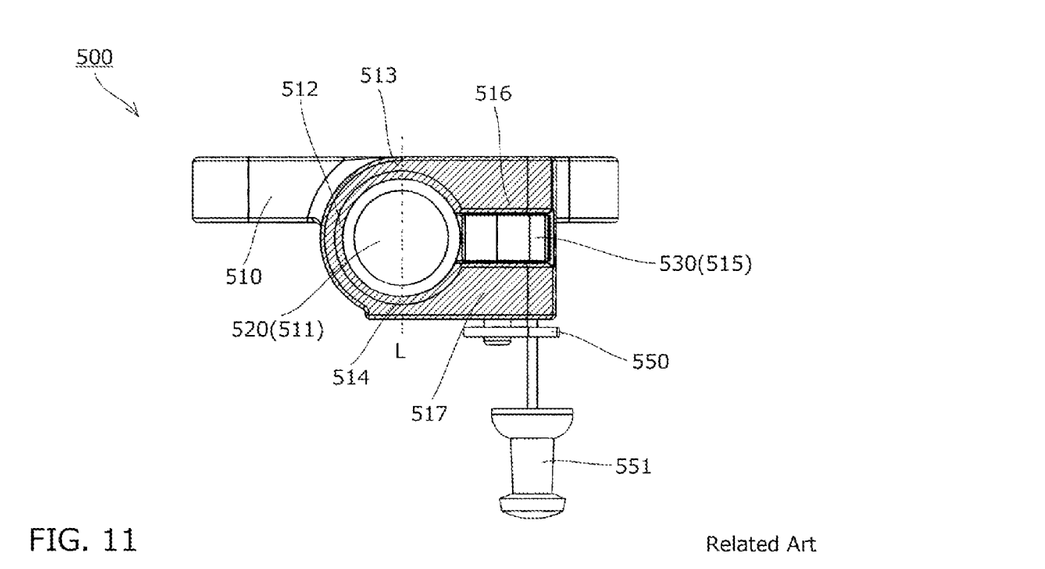
FIG. 11 is an explanatory drawing in which the conventional tensioner is viewed from above.
Figure 12:
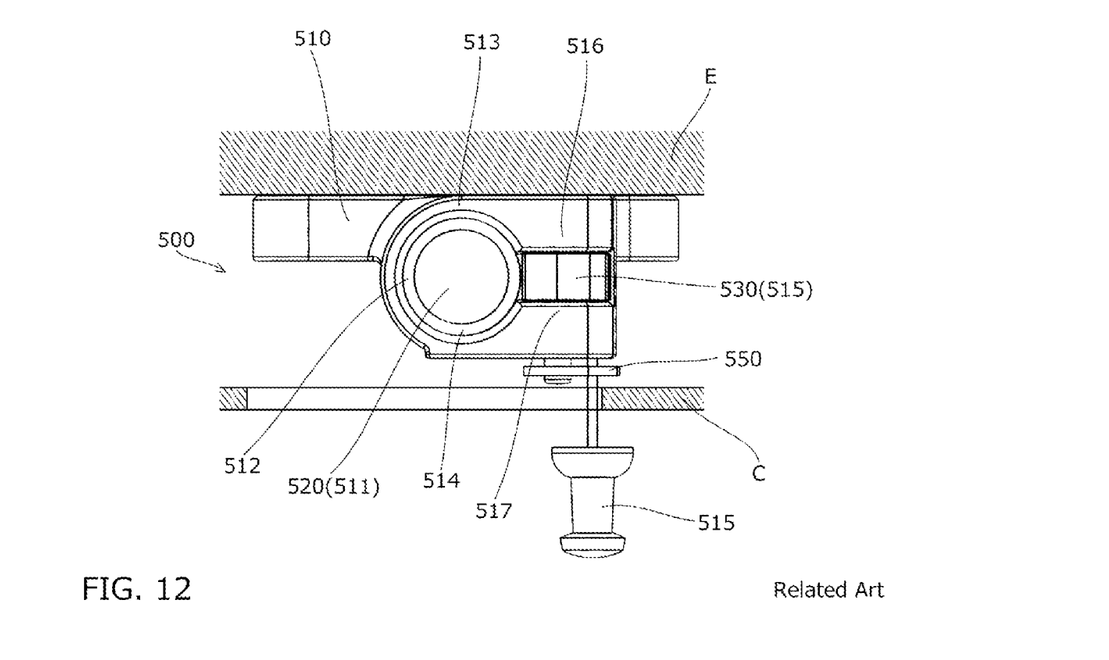
FIG. 12 is an explanatory drawing in which the mounting mode of the conventional tensioner is viewed from above.

A tensioner 500 has been widely used which includes, as depicted in FIGS. 10 to 12, a tensioner body 510 having a plunger housing hole 511 and a ratchet housing groove 515; a plunger 520 slidably inserted into the plunger housing hole 511; and a ratchet 530 which is disposed in the ratchet housing groove 515 in a state of being capable of swinging on a ratchet pin 540 supported on the tensioner body 510, the ratchet engaging with the plunger 520 and regulating the movement of the plunger 520 toward the housing side (see, for example, Japanese Patent Application Publication Nos. 2006-234088, 2004-44749, and H11-344036).

As depicted in FIGS. 10 to 12, the tensioner body 510 has a hole outer circumferential wall 512 disposed on the outer circumference of the plunger housing hole 511, and a first pin support wall 516 and a second pin support wall 517 which are disposed apart from each other in the pin longitudinal direction of the ratchet pin 540 and support the both end sides of the ratchet pin 540, and the hole outer circumferential wall 512 has a first outer circumferential wall portion 513 and a second outer circumferential wall portion 514 at positions crossing a virtual line L extending in the pin longitudinal direction through the center of the plunger housing hole 511.

SUMMARY OF THE INVENTION

However, in the conventional tensioner 500, the outer side surface of the first pin support wall 516 is formed such as to be flush with the outer side surface of the first outer circumferential wall portion 513, the outer side surface of the second pin support wall 517 is formed such as to be flush with the outer side surface of the second outer circumferential wall portion 514, and there is a large difference between the thickness of the first outer circumferential wall portion 513 and second outer circumferential wall portion 514 and the thickness of the first pin support wall 516 and second pin support wall 517. Therefore, when the plunger 520 is back-stopped (when the movement of the plunger 520 toward the housing side is controlled) by the ratchet 530, stresses can concentrate in the first outer circumferential wall portion 513 and second outer circumferential wall portion 514 and the durability of the tensioner body 510 can be degraded.

Further, in such a tensioner 500, as depicted in FIGS. 10 to 12, a stopper lever 550 is fixed to one end of the ratchet pin 540 at the outside of the second pin support wall 517 in order to restrain temporarily the projection of the plunger 520, and the ratchet 530 is typically restrained by inserting the stopper pin 551 into the stopper lever 550 and the tensioner body 510.

However, in the conventional tensioner 500, as depicted in FIGS. 10 to 12, the outer side surface of the second pin support wall 517 is formed such as to be flush with the outer side surface of the second outer circumferential wall portion 514, and the stopper lever 550 protrudes to the outside beyond the outer side surface of the second outer circumferential wall portion 514. Therefore, when an engine front case C is mounted, the engine front case C needs to be disposed such as not to interfere with the stopper lever 550. As a result, the engine space needs to be increased according to the size of the stopper lever 550. A reference numeral E in FIG. 1 denotes an engine block serving as a tensioner mounting object for mounting the tensioner 500.

The present invention has been created to resolve the abovementioned problems and it is an objective of the present invention to provide a tensioner such that the durability of the tensioner body is increased, the tensioner body is reduced in weight, and the arrangement space is reduced.

The present invention resolves the abovementioned problems by providing a tensioner including: a tensioner body having a plunger housing hole and a ratchet housing groove; a plunger slidably inserted into the plunger housing hole; and a ratchet disposed in the ratchet housing groove in a state of being capable of swinging about a ratchet pin supported on the tensioner body, wherein the tensioner body has a hole outer circumferential wall disposed on an outer circumference of the plunger housing hole, and a pair of pin support walls that is disposed apart from each other in a pin longitudinal direction of the ratchet pin and supports both end sides of the ratchet pin; the hole outer circumferential wall has a pair of outer circumferential wall portions crossing a virtual line extending in the pin longitudinal direction through a center of the plunger housing hole; and at least one of outer side surfaces of the pair of pin support walls is formed on an inner side, in the pin longitudinal direction, of an outer side surface of one of the outer circumferential wall portions.

According to the invention as in claim 1, the tensioner body has a hole outer circumferential wall disposed on an outer circumference of the plunger housing hole, and a pair of pin support walls that is disposed apart from each other in a pin longitudinal direction of the ratchet pin and supports both end sides of the ratchet pin; the hole outer circumferential wall has a pair of outer circumferential wall portions crossing a virtual line extending in the pin longitudinal direction through a center of the plunger housing hole; and at least one of outer side surfaces of the pair of pin support walls is formed on an inner side, in the pin longitudinal direction, of the outer side surface of one of the outer circumferential wall portions. As a result, the thickness of at least one of the pair of pin support walls is reduced and stresses that are typically concentrated in the outer circumferential wall portions when the plunger is back-stopped by the ratchet (when the movement of the plunger toward the housing side is controlled) can be dispersed in the pin support walls. Therefore, the durability of the tensioner body can be increased. Further, since the thickness of at least one of the pair of pin support walls is reduced, the tensioner body can be reduced in weight.

According to the invention as in claim 2, an outer side surface of the second pin support wall, which is on the side opposite that of the tensioner mounting object, is formed on an inner side, in the pin longitudinal direction, of an outer side surface of one of the second outer circumferential wall portions, which is on the side opposite that of the tensioner mounting object. As a result, even when, for example, a stopper lever for temporarily restraining the protrusion of the plunger 120 is disposed on the outside of the second pin support wall, the protrusion of the stopper lever or the like to the outside of the outer side surface of the second outer circumferential wall portion can be avoided or the protrusion amount of the stopper lever or the like can be reduced. Therefore, the space necessary for disposing the tensioner can be reduced.

According to the invention as in claim 3, a distance in the pin longitudinal direction between the outer side surface of the second pin support wall and the outer side surface of the second outer circumferential wall portion is set greater than a thickness, in the pin longitudinal direction, of the stopper lever. As a result, the protrusion of the stopper lever to the outside of the outer side surface of the second outer circumferential wall portion can be avoided. Therefore, the space necessary for disposing the tensioner can be reduced.

According to the invention as in claim 4, the outer side surface of the second pin support wall is formed on an inner side, in the pin longitudinal direction, of the outer side surface of the second outer circumferential wall portion. In addition, the outer side surface of the first pin support wall is also formed on an inner side, in the pin longitudinal direction, of the outer side surface of the first outer circumferential wall portion. As a result, stresses which typically concentrate in the outer circumferential wall portions when the plunger is back-stopped by the ratchet are dispersed in both the first pin support wall and the second pin support wall and the durability of the tensioner body can be further increased. Furthermore, by reducing the thickness of both the first pin support wall and the second pin support wall, it is possible to reduce further the weight of the tensioner body.

According to the invention as in claim 5, a thickness, in the pin longitudinal direction, of at least one of the pair of pin support walls is set to 50 to 80% of a distance, in the pin longitudinal direction, between the outer side surface of the outer circumferential wall portion and the inner side surface of the pin support wall. As a result, stresses appearing when the plunger is back-stopped by the ratchet can be effectively dispersed in the pin support walls, while ensuring the strength of the pin support walls that support the ratchet pin.

DESCRIPTION OF THE PREFERRED EMBODIMENTS

A tensioner 100 according to the first embodiment of the present invention will be explained hereinbelow with reference to FIGS. 1 to 5.

Figure 1:
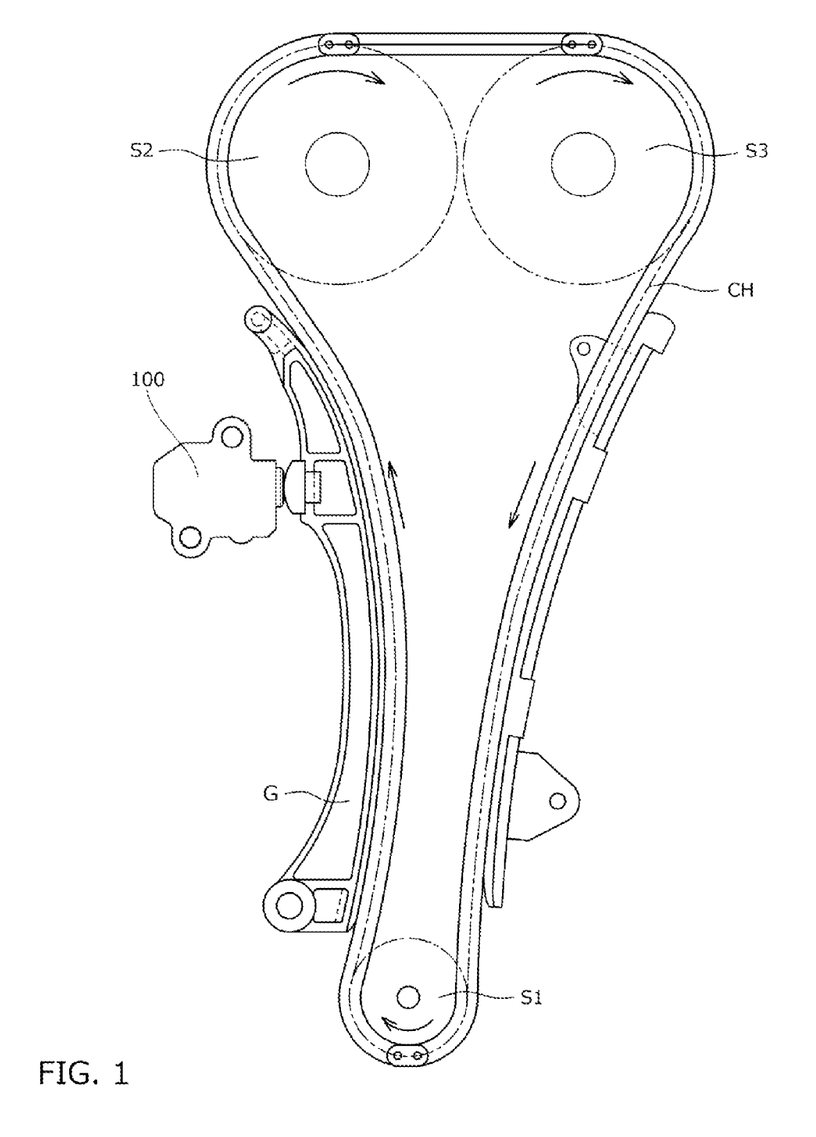
FIG. 1 is an explanatory drawing illustrating a timing system incorporating the tensioner of the first embodiment.

The tensioner 100 of the present embodiment is incorporated in a chain transmission for use in, for example, a timing system of an engine. As depicted in FIG. 1, this tensioner imparts an appropriate tension through a tensioner lever G to a slack side of a transmission chain CH, which is stretched over a plurality of sprockets S1 to S3, and suppresses vibrations appearing when a vehicle travels.

Figure 2:
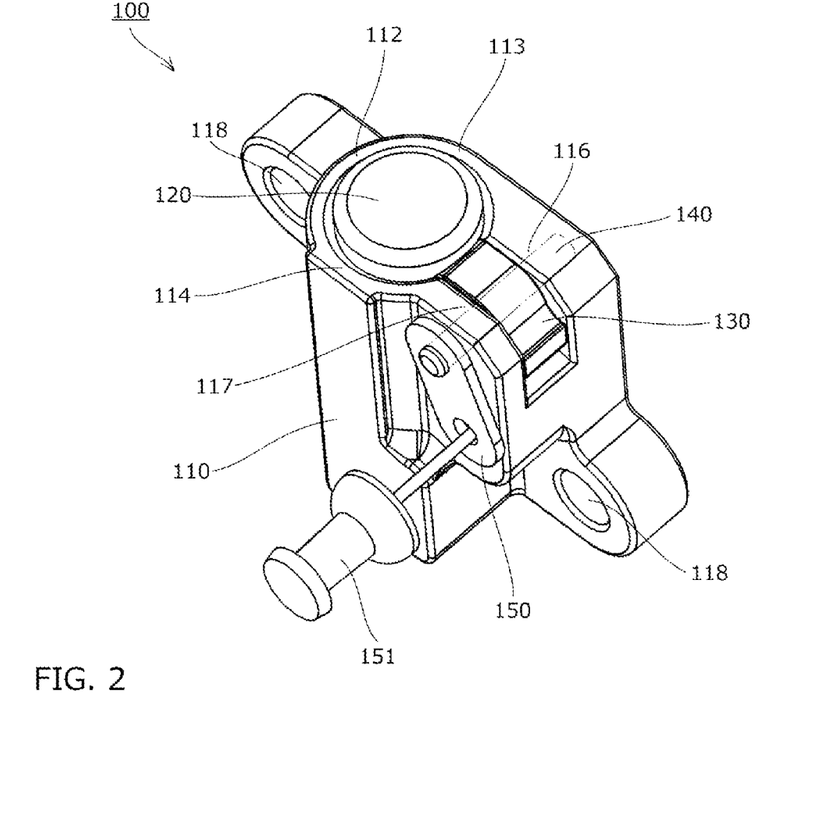
FIG. 2 is a perspective view illustrating the tensioner of the first embodiment.
Figure 3:
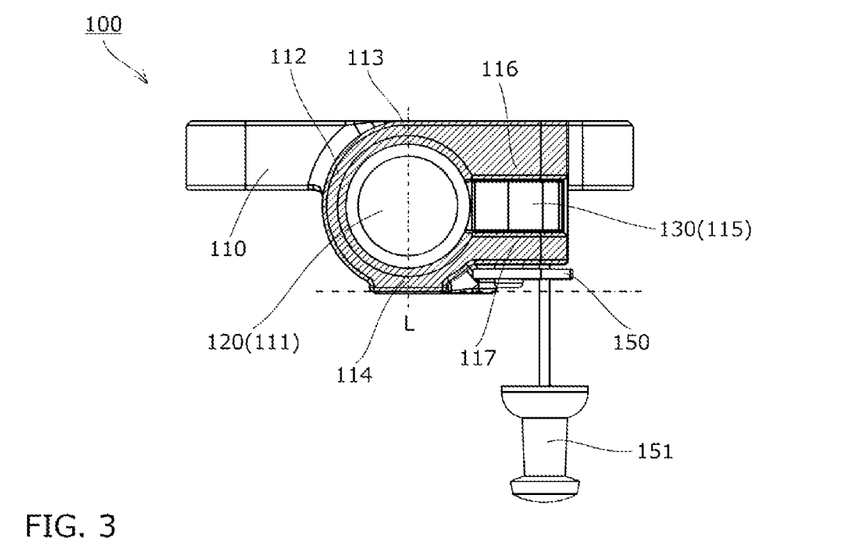
FIG. 3 is an explanatory drawing in which the tensioner of the first embodiment is viewed from above.
Figure 4:
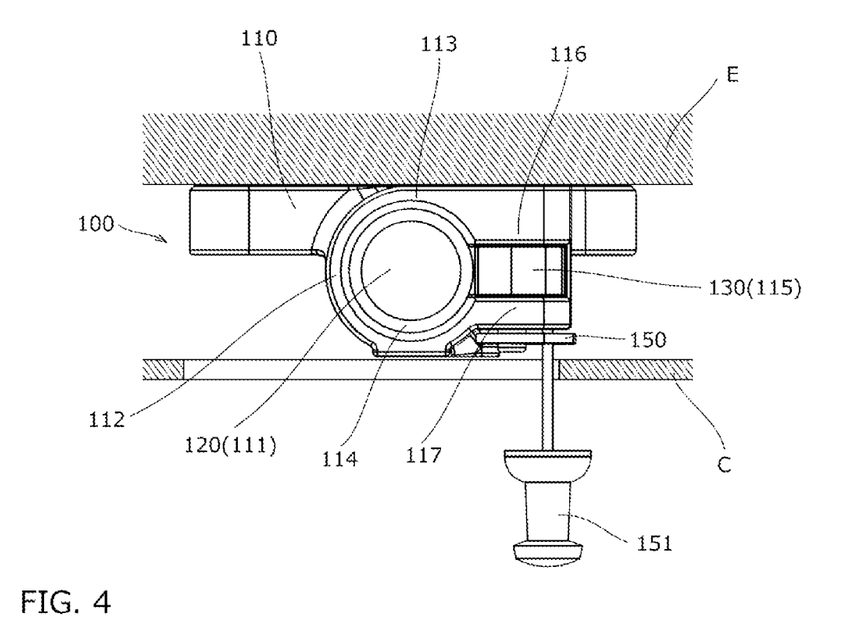
FIG. 4 is an explanatory drawing in which the mounting mode of the tensioner of the first embodiment is viewed from above.

As depicted in FIGS. 2 to 4, the tensioner 100 is provided with a tensioner body 110 having a plunger housing hole 111 and a ratchet housing groove 115, a plunger 120 slidably inserted in the plunger housing hole 111, a ratchet 130 which is swingably disposed in the ratchet housing groove 115, an energizing mechanism (not shown in the figures) that energizes the plunger 120 in the direction of protruding, and a stopper lever 150 and a stopper pin 151 which are used for temporarily restraining the protrusion of the plunger 120.

As depicted in FIGS. 2 to 4, the tensioner body 110 has a cylindrical plunger housing hole 111 open at one side and a ratchet housing groove 115 formed continuously with the plunger housing hole 111. The diameter of the plunger housing hole 111 is larger than the width of the ratchet housing groove 115 in the pin longitudinal direction of the ratchet pin 140. Further, the plunger housing hole 111 and the ratchet housing groove 115 are formed at positions coinciding with each other in the pin longitudinal direction in the central portion in the pin longitudinal direction.

As depicted in FIGS. 2 to 4, the tensioner body 110 has a hole outer circumferential wall 112 disposed on the outer circumference of the plunger housing hole 111, and the hole outer circumferential wall 112 has a first outer circumferential wall portion 113 and a second outer circumferential wall portion 114 at positions crossing a virtual line L extending in the pin longitudinal direction through the center of the plunger housing hole 111.

Further, as depicted in FIGS. 2 to 4, the tensioner body 110 has a pair of pin support walls 116, 117 which is disposed apart from each other in the pin longitudinal direction and supports the both end sides of the ratchet pin 140. The pair of pin support walls 116, 117 includes the first pin support wall 116 facing an engine block E side and the second pin support wall 117 on the opposite side.

Figure 5:
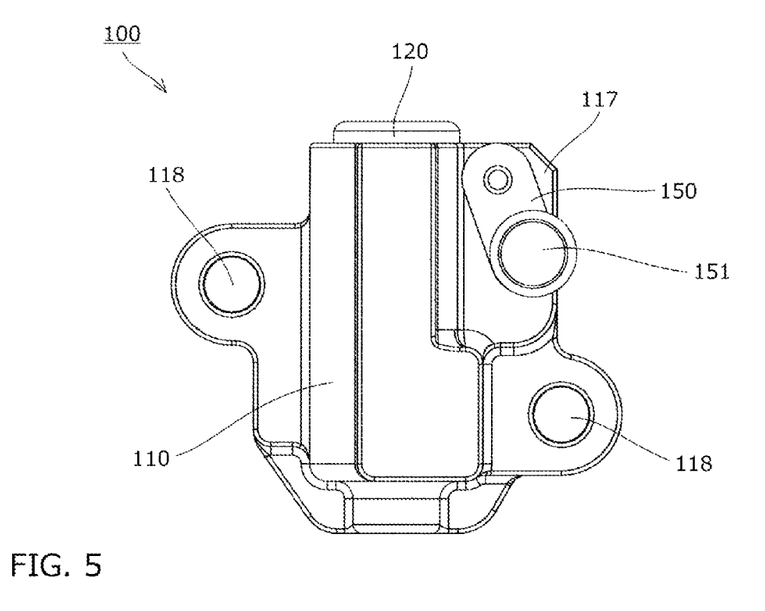
FIG. 5 is an explanatory drawing in which the tensioner of the first embodiment is viewed from the front surface.

As depicted in FIGS. 2 to 4, the outer side surface of the first pin support wall 116 is formed to be flush with the outer side surface of the first outer circumferential wall portion 113, whereas the outer side surface of the second pin support wall 117 is formed on the inner side, in the pin longitudinal direction, of the outer side surface of the second outer circumferential wall portion 114. In other words, a thinned portion receding in the pin longitudinal direction with respect to the outer side surface of the second outer circumferential wall portion 114 is formed at the outer side surface of the second pin support wall 117. As depicted in FIG. 5, the thinned portion is formed such that the lower end thereof in the plunger protrusion direction (vertical direction in FIG. 5) is at the same position as the lower end of the ratchet housing groove 115 or below the lower end of the ratchet housing groove 115. The thickness of the second pin support wall 117 in the pin longitudinal direction is set to 50 to 80% of the distance, in the pin longitudinal direction, between the outer side surface of the second outer circumferential wall portion 114 and the inner side surface of the second pin support wall 117.

As depicted in FIG. 2, the ratchet 130 is fixed to the ratchet pin 140 which is rotatably supported by the first pin support wall 116 and the second pin support wall 117 and is disposed in the ratchet housing groove 115 so as to be capable of swinging on the ratchet pin 140. The ratchet 130 has two ratchet hooks (not shown in the figure) engageable with rack teeth (not shown in the figure) formed on the outer circumference to the plunger 120. The ratchet hooks are energized by an energizing spring (not shown in the figure) so as to engage with the rack teeth of the plunger 120 and regulates the movement of the plunger 120 to the housing side.

As depicted in FIG. 2, the stopper lever 150 is fixed to a pin end of the ratchet pin 140 protruding from the outer side surface of the second outer circumferential wall portion 114 on the outside side of the second outer circumferential wall portion 114. Further, the stopper pin 151 temporarily restrains the protrusion of the plunger 120. More specifically, the stopper pin 151 is inserted into a hole formed in the stopper lever 150 and the tensioner body 110 and restrains the stopper lever 150, the ratchet pin 140, and the ratchet 130. The thickness of the stopper lever 150 in the pin longitudinal direction is set to be less than the distance, in the pin longitudinal direction, between the outer side surface of the second pin support wall 117 and the outer side surface of the second outer circumferential wall portion 114, and the stopper lever 150 and the pin end of the ratchet pin 140 do not protrude to the outside of the outer side surface of the second outer circumferential wall portion 114.

In the tensioner 100, as depicted in FIG. 4, the first pin support wall 116 and the first outer circumferential wall portion 113 of the tensioner body 110 are mounted, while facing the engine block E which is the tensioner mounting object, on the engine block E with a mounting bolt (not shown in the figure) which is inserted into a mounting hole 118 of the tensioner body 110, and the engine front case C is mounted on the tensioner body 110 on the second pin support wall 117 and second outer circumferential wall portion 114 side thereof.

A tensioner 200 according to the second embodiment of the present invention will be explained hereinbelow with reference to FIGS. 6 and 7. In the second embodiment, components other than the pin support walls of the tensioner body are exactly the same as in the above-described first embodiment. Therefore, the components other the pin support walls of the tensioner body, which are denoted by the reference numerals of a 100 series in the description and drawings relating to the first embodiment are denoted by the reference numerals of a 200 series and the explanation thereof is herein omitted.

Figure 6:
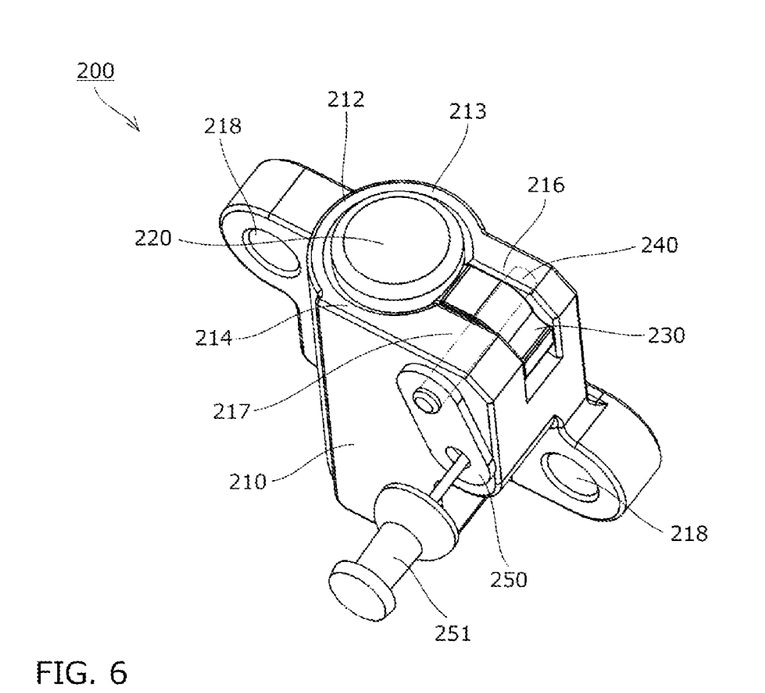
FIG. 6 is a perspective view illustrating the tensioner of the second embodiment.
Figure 7:
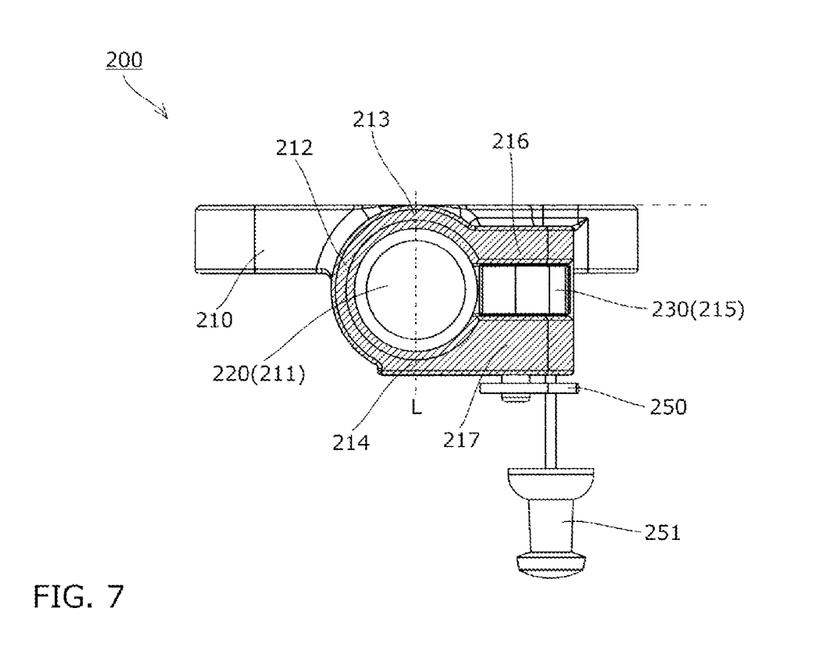
FIG. 7 is an explanatory drawing in which the tensioner of the second embodiment is viewed from above.

As depicted in FIGS. 6 and 7, in the tensioner 200 according to the second embodiment, the outer side surface of a first pin support wall 216 is formed on the inner side, in the pin longitudinal direction, of the outer side surface of a first outer circumferential wall portion 213, whereas the outer side surface of a second pin support wall 217 is formed flush with the outer side surface of the second outer circumferential wall portion 214.

The thickness, in the pin longitudinal direction, of the first pin support wall 216 is set to 50 to 80% of the distance, in the pin longitudinal direction, between the outer side surface of the first outer circumferential wall portion 213 and the inner side surface of the first pin support wall 216.

A tensioner 300 according to the third embodiment of the present invention will be explained hereinbelow with reference to FIGS. 8 and 9. In the third embodiment, components other than the pin support walls of the tensioner body are exactly the same as in the above-described first embodiment. Therefore, the components other the pin support walls of the tensioner body, which are denoted by the reference numerals of a 100 series in the description and drawings relating to the first embodiment are denoted by the reference numerals of a 300 series and the explanation thereof is herein omitted.

Figure 8:
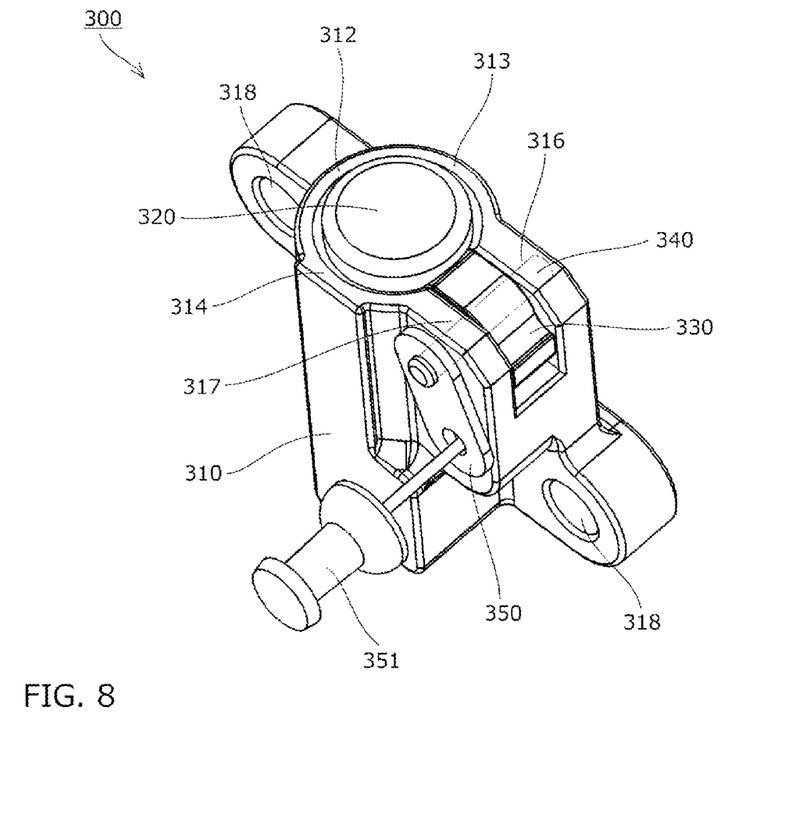
FIG. 8 is a perspective view illustrating the tensioner of the third embodiment.
Figure 9:
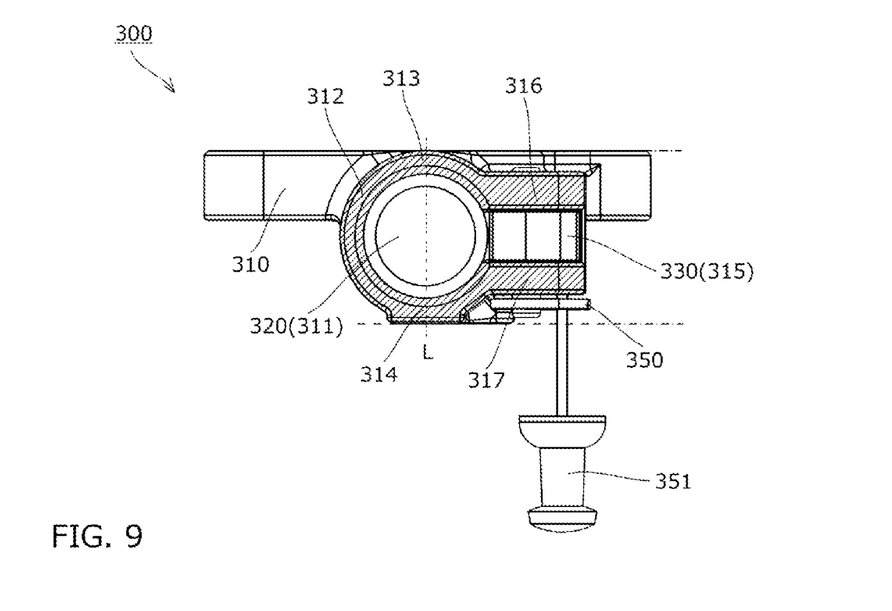
FIG. 9 is an explanatory drawing in which the tensioner of the third embodiment is viewed from above.

As depicted in FIGS. 8 and 9, in the tensioner 300 according to the third embodiment, the outer side surface of a first pin support wall 316 is formed on the inner side, in the pin longitudinal direction, of the outer side surface of a first outer circumferential wall portion 313, and the outer side surface of a second pin support wall 317 is likewise formed on the inner side, in the pin longitudinal direction, of the second outer circumferential wall portion 314.

The thickness, in the pin longitudinal direction, of the first pin support wall 316 is set to 50 to 80% of the distance, in the pin longitudinal direction, between the outer side surface of the first outer circumferential wall portion 313 and the inner side surface of the first pin support wall 316. Further, the thickness, in the pin longitudinal direction, of the second pin support wall 317 is set to 50 to 80% of the distance, in the pin longitudinal direction, between the outer side surface of the second outer circumferential wall portion 314 and the inner side surface of the second pin support wall 317.

The embodiments of the present invention are described hereinabove, but the present invention is not limited thereto, and various design changes can be made without departing from the scope of the invention defined by the claims.

For example, in the above-described embodiments, the case is explained in which the tensioner is incorporated in the timing system for an automobile engine, but specific applications of the tensioner are not limited thereto.

Further, in the above-described embodiments, the case is explained in which the tension imparts tension to the transmission chain through the tensioner lever, but tension may be also imparted to the transmission chain by direct slidable guiding of the transmission chain with the distal end of the plunger.

Further, possible applications are not limited to the transmission mechanism using the transmission chain and include similar transmission mechanisms such as a belt or a rope. Thus, the invention can be used in a variety of industrial fields, provided that tension needs to be imparted to an elongated body.

Further, in the above-described embodiments, the stopper lever and stopper pin are provided for temporarily restraining the protrusion of the plunger when the tensioner is mounted on the engine block. However, specific forms of the means for temporarily restricting the protrusion of the plunger are not limited thereof. For example, a configuration may be used in which a stopper pin is directly engaged with the ratchet to restrain the ratchet temporarily.

What is claimed is:

1. A tensioner comprising: a tensioner body having a plunger housing hole and a ratchet housing groove; a plunger slidably inserted into the plunger housing hole; and a ratchet disposed in the ratchet housing groove in a state of being capable of swinging about a ratchet pin supported on the tensioner body, wherein the tensioner body has a hole outer circumferential wall disposed on an outer circumference of the plunger housing hole, and a pair of pin support walls that is disposed apart from each other in a pin longitudinal direction of the ratchet pin and supports both end sides of the ratchet pin, the hole outer circumferential wall has a pair of outer circumferential wall portions crossing a virtual line extending in the pin longitudinal direction through a center of the plunger housing hole, at least one of outer side surfaces of the pair of pin support walls is formed on an inner side, in the pin longitudinal direction, of an outer side surface of one of the outer circumferential wall portions, and wherein the pair of pin support walls includes a first pin support wall facing a tensioner mounting object side and a second pin support wall on an opposite side;

the pair of outer circumferential wall portions has a first outer circumferential wall portion facing the tensioner mounting object side and a second outer circumferential wall portion on the opposite side; and an outer side surface of the second pin support wall is formed on an inner side, in the pin longitudinal direction, of an outer side surface of the second outer circumferential wall portion;

a stopper lever that is fixed to a pin end of the ratchet pin, which protrudes from the outer side surface of the second pin support wall, wherein a distance in the pin longitudinal direction between the outer side surface of the second pin support wall and the outer side surface of the second outer circumferential wall portion is set greater than a thickness, in the pin longitudinal direction, of the stopper lever.

2. The tensioner according to claim 1, wherein a thickness, in the pin longitudinal direction, of at least one of the pair of pin support walls is set to 50-80% of a distance, in the pin longitudinal direction, between the outer side surface of the outer circumferential wall portion and the inner side surface of the pin support wall.

\* \* \* \* \*